US005672761A

United States Patent [19]

Adkins et al.

[11] Patent Number: 5,672,761
[45] Date of Patent: Sep. 30, 1997

[54] METHOD FOR REDUCING THE VISCOSITY OF HIGH VISCOSITY POLYETHER POLYOLS

[75] Inventors: Rick L. Adkins, New Martinsville; William E. Slack, Moundsville, both of W. Va.

[73] Assignee: Bayer Corporation, Pittsburgh, Pa.

[21] Appl. No.: 642,140

[22] Filed: May 2, 1996

[51] Int. Cl.[6] .................................................. C07C 209/16
[52] U.S. Cl. ............................................ 564/475; 564/474
[58] Field of Search ............................... 564/474, 475

[56] References Cited

U.S. PATENT DOCUMENTS

| | | | |
|---|---|---|---|
| 3,654,370 | 4/1972 | Yeakey | 260/584 B |
| 3,666,729 | 5/1972 | Grogler et al. | 260/77.5 CH |
| 3,691,112 | 9/1972 | Grogler et al. | 260/2.5 AM |
| 4,902,768 | 2/1990 | Gerkin et al. | 528/68 |
| 5,015,774 | 5/1991 | Suekane et al. | 564/475 |
| 5,043,472 | 8/1991 | Mafoti | 560/358 |

*Primary Examiner*—Brian M. Burn
*Attorney, Agent, or Firm*—Joseph C. Gil; Lyndanne M. Whalen

[57] ABSTRACT

The viscosity of polyether polyols characterized by functionalities greater than or equal to 1, viscosities greater than 500 mPa·s at 25° C. and at least 20% terminal secondary hydroxyl groups is reduced by converting at least one terminal hydroxyl group of the polyether to a leaving group and then reacting the conversion product with a primary amine or ammonia at a temperature of from about 70° to 250° C.

4 Claims, No Drawings

METHOD FOR REDUCING THE VISCOSITY OF HIGH VISCOSITY POLYETHER POLYOLS

BACKGROUND OF THE INVENTION

The present invention relates to a method for reducing the viscosity of high viscosity polyether polyols.

Amine terminated polyethers and various processes for preparing amine terminated polyethers are known in the art. Given the recent success of RIM systems based on the amine-terminated polyethers, there is a considerable interest in improving these polyethers and the processes for their production. Of particular interest are amine-terminated polyethers which are both highly reactive and relatively easy to process.

U.S. Pat. No. 3,654,370 discloses amine-terminated polyethers which are prepared by reacting polyols with ammonia under catalyzed high temperature reaction conditions.

U.S. Pat. Nos. 3,666,726; 3,691,112; and 5,043,472 disclose amine-terminated polyethers which are prepared by reacting a polyfunctional acetoacetic acid ester with a polyfunctional amine.

U.S. Pat. No. 4,902,768 discloses N-(polyoxyalkyl)-N(alkyl)amine by catalytic amination of an appropriate polyol by reacting the polyol with a primary or secondary amine in the presence of a catalyst such as nickel.

U.S. Pat. No. 5,015,774 discloses a process for preparing polyoxyalkylene polyamines having secondary amino groups at the end of the polyamine by reacting polyoxyalkylene polyol with a primary amine in the presence of a catalyst containing nickel and zinc, cobalt and zinc or cobalt, zinc and nickel.

Applicants' related application, U.S. Ser. No. 07/957,929, filed Oct. 7, 1992, discloses a method for producing amine-terminated polyethers in which the amino groups are secondary amino groups. This application does not, however, teach or suggest that the process disclosed therein could, in some cases, produce a polyether having a substantially lower viscosity than the polyether polyol starting material.

SUMMARY OF THE INVENTION

It is an object of the present invention to provide a method for reducing the viscosity of a polyether polyol.

This and other objects which will be apparent to those skilled in the art are accomplished by reacting a high viscosity polyether polyol satisfying specified criteria in which at least one of the terminal hydroxyl groups has been converted to a good leaving group with a primary amine or ammonia at a temperature of from about 70° to about 250° C. The polyols useful in the practice of the present invention are characterized by high viscosities (i.e., viscosities greater than 500 mPa·s at 25° C.) and at least 20% secondary hydroxyl groups.

DETAILED DESCRIPTION OF THE PRESENT INVENTION

The present invention is directed to a method for substantially reducing the viscosity of a high viscosity polyether polyol in which at least 20% of the terminal groups of that polyol are propylene oxide. In this method, at least one terminal hydroxyl group of the high viscosity polyether polyol satisfying specific criteria is converted to a good leaving group (e.g., a halide or sulfonate group). This high viscosity polyether polyol containing a good leaving group is reacted with a primary amine or ammonia at a temperature of from about 70° to 250° C. The high viscosity polyether polyols which may be used in the method of the present invention are characterized by a viscosity greater than 500 mPa·s at 25° C., an OH number of from about 22 to about 700, a functionality of at least 1, and a molecular weight of from about 160 to about 8,000 (number average determined by end group analysis). A key feature of these polyether polyols is a propylene oxide termination of at least 20% of the polyol, preferably from about 50 to about 100% propylene oxide termination, most preferably from about 90 to about 100% propylene oxide termination.

Examples of suitable polyether polyols useful in the practice of the present invention include any of the following which are terminated with at least 20% propylene oxide groups: polyethylene oxide alcohols, polypropylene oxide alcohols, polytetrahydrofuran alcohols, cyclic polyethers, polycyclic polyethers, sucrose-based polyethers, aminoalcohols, polystyrene oxide, polyglycidol, and polyepichlorohydrin.

The polyethers containing hydroxyl groups useful in the practice of the present invention may be obtained (1) by polymerizing an alkylene oxide such as ethylene oxide, propylene oxide, butylene oxide, tetrahydrofuran, styrene oxide or epichlorohydrin alone in the presence of, for example, boron trifluoride and adding sufficient propylene oxide thereto to ensure that at least 20% of the total number of terminal groups are propylene oxide or (2) by the addition of an alkylene oxide, optionally in admixture or successively onto starter components containing reactive hydrogen atoms and then adding sufficient propylene oxide to ensure that at least 20% of the total number of terminal groups are propylene oxide groups. Suitable starter components for use in method (2) include: water; alcohols such as ethylene glycol, 1,3- or 1,2-propylene glycol, trimethylol propane, 4,4'-dihydroxydiphenyl propane; and amines such as aniline, ammonia, ethanol amine and ethylene diamine; and mixtures thereof.

A good leaving group is that which can be displaced at the carbon atom by a nucleophile such as nitrogen, oxygen, sulfur or an anion of such nucleophiles. The rate at which displacement occurs will, of course, depend upon the chemical nature of the leaving group.

In the method of the present invention, a high viscosity polyether polyol satisfying the above-specified criteria having a terminal leaving group is reacted with a primary amine or ammonia at a temperature of from about 70° to 250° C., optionally in the presence of an acid scavenger (e.g., a tertiary amine) or an inorganic base (e.g., sodium hydroxide).

The polyether polyol which is terminated with a leaving group can be obtained by converting at least one hydroxyl group of the polyol to a suitable leaving group. Examples of suitable leaving groups include: halides (particularly, chloride, bromide and iodide), sulfonates, and nitrophenoxy groups. Preferred leaving groups are sulfonates such as methyl sulfonate.

A polyether containing a chloride leaving group may be prepared, for example, by reacting the polyether polyol with a halogenation reagent such as carbonyl chloride. The carbonyl chloride and polyether polyol react to form a chloroformate which may be rearranged to form a polyether alkyl chloride by heating or exposure to a tertiary amine or amide catalyst. Alternatively, carbonyl chloride can be added to a solution of the polyol in N,N-dimethylformamide to form the chloride directly. Other halogenation reagents that can be reacted with the polyol include: thionyl chloride, methane sulfonyl chloride in dimethyl formamide or triphenyl phosphine in carbon tetrachloride.

In preparing a polyether sulfonate, the polyol may be reacted with methane sulfonyl chloride typically in the presence of a tertiary amine or amide. The reaction is generally conducted at a temperature of from about −30° to about 40° C.

Solvents such as methylene chloride, toluene, chlorobenzene or tetrahydrofuran can be employed in the above methods for preparing the high viscosity polyether polyol with a leaving group.

Primary amines are reacted with the polyether containing a leaving group at a temperature within the range of 70° to 250° C.

The primary amines useful in the practice of the present invention include: ammonia, aliphatic, cycloaliphatic or aromatic mono- and polyamines having from 1 to 18 (preferably from 6 to 8) carbon atoms. These amines can be used alone or in combination. Examples of suitable amines include: butyl-amine, aniline, cyclohexylamine, 2-ethyl hexyl amine, 2-aminoethyl piperidine and mixtures thereof. The ratio of moles of amine to equivalents of leaving group of the polyether is generally from about 12:1 to about 1:1, preferably about 3:1.

Sodium bicarbonate or sodium hydroxide may be employed as an acid scavenger in the amine displacement reaction which takes place in the course of the method of the present invention.

The amine-terminated polyethers treated in accordance with the method of the present invention are obtained in high conversions (i.e., conversions greater that 85%) with relatively low viscosities of from about 50 to about 1000 mPa·s at 25° C.

Having thus described our invention, the following Examples are given as being illustrative thereof.

EXAMPLES

In the examples which follow, these materials were used:

POLYOL A: A trimethylol propane/propylene oxide adduct having an OH number of 370, a functionality of 3, 100% terminal propylene oxide and a molecular weight of 455.

POLYOL B: A 2-aminoethanol/propylene oxide adduct having an OH number of 700, a functionality of 3, 100% terminal propylene oxide and a molecular weight of 455.

POLYOL C: A sucrose/propylene glycol/water/propylene oxide adduct having an OH number of 470, a functionality of 5.23, 100% terminal propylene oxide and a molecular weight of 625.

POLYOL D: A sucrose/glycerol/ethylene oxide/propylene oxide adduct having an OH number of 365, a functionality of 7.2, 100% terminal propylene oxide and a molecular weight of 1117.

POLYOL E: An ortho-toluene diamine/ethylene oxide/propylene oxide adduct having an OH number of 395, a functionality of 4, 100% terminal propylene oxide and a molecular weight of 568.

POLYOL F: A toluene diamine/ethylene oxide/propylene oxide adduct having an OH number of 465, a functionality of 4, 100% terminal propylene oxide and a molecular weight of 483.

POLYOL G: A propylene glycol/propylene oxide adduct having an OH number of 56, a functionality of 2, a molecular weight of 2,000 and 100% terminal propylene oxide.

POLYOL H: A glycerine/propylene oxide/ethylene oxide adduct having an OH number of 35, a functionality of 3, a molecular weight of 4800, and 82% terminal primary hydroxyl group (i.e., 18% terminal propylene oxide groups).

Example 1

0.1 equivalents of POLYOL A, 0.112 mols of triethylenediamine, and 60 ml of $CH_2Cl_2$ were added to a 2 liter three-necked flask fitted with a stirrer and a reflux condenser (under nitrogen). 0.112 mols of methane sulfonyl chloride were added dropwise to the flask while maintaining the contents of the flask at 25° C. with an ice water bath. The reaction solution was stirred at room temperature for 30 minutes and then neutralized with 0.112 mols of sodium hydroxide. Triethylamine, solvent and water were vacuum stripped and the product was filtered. The product was filtered and a colorless liquid (Mesylate A) was recovered.

0.0594 equivalents of Mesylate A were added to a 500 ml three-necked flask fitted with a stirrer and reflux condenser (under nitrogen). 0.178 mol of 2-ethylhexylamine were added to the flask and the contents of the flask were then heated at 150° C. for 5 hours. The contents of the flask were then cooled and neutralized with 0.060 mol of sodium hydroxide. Excess amine and water were vacuum stripped and the remaining mixture was filtered. A clear, light yellow liquid having a viscosity of 125 mPa·s and an amine number of 182.5 was obtained.

The amine number of this product and the products produced in the Examples which follow was determined by potentiometric titration of a sample of the amine in glacial acetic acid with a 0.10N perchloric acid solution.

Examples 2–6

The procedure of Example 1 was repeated with the exception that a different mesylate was used. The mesylate of each of POLYOLS B, C, D, E and F was prepared and treated in accordance with the method described in Example 1. The letter of the product mesylate corresponds to that of the POLYOL from which it was produced. For example, Mesylate C is the mesylate based on POLYOL C; Mesylate D is the mesylate based on POLYOL D, etc.

The specific Mesylate used in each of these Examples is identified in the Table below. The characteristics of the product of each of these Examples are also presented in the Table below.

TABLE

| Example | Mesylate | Amine Number of Product | POLYOL/ Viscosity at 25° C. (mPa·s) | Viscosity of Amine at 25° C. (mPa·s) |
|---|---|---|---|---|
| 1 | A | 182.5 | 650 | 125 |
| 2 | B | 371.1 | 800 | 72 |
| 3 | C | 182.6 | 30,000 | 590 |
| 4 | D | 186.8 | 22,500 | 855 |
| 5 | E | 236.0 | 9,000 | 331 |
| 6 | F | 288.8 | 18,000 | 550 |

Example 7

The procedure of Example 1 was repeated with the exception that the mesylate was prepared from POLYOL G which polyol had a viscosity of 320 mPa·s at 25° C. The amine product obtained had a viscosity of 256 mPa·s.

Example 8

(Comparative)

The procedure of Example 1 was repeated with the exception that the mesylate was prepared from POLYOL H which polyol had a viscosity of 800 mPa·s at 25° C. The amine product obtained had a viscosity of 980 mPa·s at 25° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for reducing the viscosity of a polyether polyol comprising
   a) converting at least one terminal hydroxyl group of a polyether polyol characterized by a viscosity greater than 500 mPa·s at 25° C. and at least 20% terminal propylene oxide groups to a leaving group, and
   b) reacting the product of a) with a primary amine or ammonia at a temperature of from about 70° to about 250° C.

2. The method of claim 1 wherein the leaving group is selected from the group consisting of a halide, a sulfonate, and a nitrophenoxy group.

3. The method of claim 1 wherein the primary amine is selected from the group consisting of an aromatic amine, an aliphatic amine, a cycloaliphatic amine and mixtures thereof.

4. The method of claim 3 wherein the primary amine is selected from the group consisting of 2-ethylhexylamine, cyclohexylamine, butylamine and aniline.

* * * * *